United States Patent
Itoh (10) Patent No.: US 7,639,382 B2
(45) Date of Patent: Dec. 29, 2009

(54) MULTI-FUNCTION DEVICE CAPABLE OF CHANGING AN ORDERING OF PRIORITY FOR DISPLAYING INFORMATION RELATED TO A PLURALITY OF TYPES OF FUNCTIONS

(75) Inventor: Shingo Itoh, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 663 days.

(21) Appl. No.: 10/932,079

(22) Filed: Sep. 2, 2004

(65) Prior Publication Data
US 2005/0052691 A1    Mar. 10, 2005

(30) Foreign Application Priority Data
Sep. 4, 2003    (JP)    ............... 2003-313022

(51) Int. Cl.
G06F 3/12    (2006.01)
G03G 15/00    (2006.01)
(52) U.S. Cl. ....................... 358/1.15; 399/81
(58) Field of Classification Search ........... 399/81; 358/1.15
See application file for complete search history.

(56) References Cited
U.S. PATENT DOCUMENTS
6,606,465 B2 *    8/2003    Mutoh et al. .............. 399/81

2001/0033394 A1*    10/2001    Ishikawa et al. ............ 358/401
2002/0105674 A1*    8/2002    Nomura et al. ............ 358/1.15
2003/0061322 A1*    3/2003    Igarashi et al. ............ 709/223

FOREIGN PATENT DOCUMENTS

| | | |
|---|---|---|
| JP | A 02-092146 | 3/1990 |
| JP | A 2-92146 | 3/1990 |
| JP | A 10-143024 | 5/1998 |
| JP | A 10-308839 | 11/1998 |
| JP | B2 3072208 | 5/2000 |
| JP | A 2000-236407 | 8/2000 |
| JP | A 2001-169039 | 6/2001 |
| JP | A 2002-094731 | 3/2002 |

* cited by examiner

*Primary Examiner*—Twyler L Haskins
*Assistant Examiner*—Fred Guillermety
(74) *Attorney, Agent, or Firm*—Oliff & Berridge, PLC (57) ABSTRACT

There is provided a multi-function device which is provided with a display unit on which information regarding at least one of the plurality of typed of functions is displayed, and a display controller that controls the display unit to display the information regarding the at least one of the plurality of types of functions on the display unit. The display controller changes ordering of priority used to determine which type of information of a plurality of types of information respectively related to the plurality of types of functions should be displayed on the display unit in accordance with user operation.

15 Claims, 7 Drawing Sheets

| 1st \ 2nd | FAX | Copy | SCAN |
|---|---|---|---|
| FAX |  | FAX | FAX |
| Copy | FAX |  | Copy |
| SCAN | FAX | Copy |  |

FIG.4B

| 1st \ 2nd | FAX | Copy | SCAN |
|---|---|---|---|
| FAX |  | Copy | FAX |
| Copy | Copy |  | Copy |
| SCAN | FAX | Copy |  |

FIG.4C

| 1st \ 2nd | FAX | Copy | SCAN |
|---|---|---|---|
| FAX |  | FAX | SCAN |
| Copy | FAX |  | SCAN |
| SCAN | SCAN | SCAN |  |

MULTI-FUNCTION DEVICE CAPABLE OF CHANGING AN ORDERING OF PRIORITY FOR DISPLAYING INFORMATION RELATED TO A PLURALITY OF TYPES OF FUNCTIONS

BACKGROUND OF THE INVENTION

The present invention relates to a multi-function device which has a plurality of functions and is capable of performing two or more functions collaterally.

Recently, facsimile devices having a copying function and a scanner function as well as the facsimile function have been proposed. Such a device having the plurality of functions is frequently called a multi-function device. For example, the facsimile device performs the copying function while performing facsimile data transmission.

In general, the multi-function device has a display panel (e.g., a liquid crystal display panel) on which information concerning one of the plurality of functions being performed is displayed.

Japanese Patent Provisional Publication No. HEI 2-92146 discloses a multi-function device. The multi-function device disclosed in the publication has a display panel for displaying information concerning one of a facsimile function and a telephone function being performed. In the facsimile device disclosed in the publication, when a function (a first function) performed firstly is interrupted by a function (a second function), a table implemented in a microprocessor is consulted to determine which type of information of the two types of information concerning the first and second functions should be displayed on the display panel.

In the facsimile device, the type of function to be displayed is determined without variation in accordance with the type of function firstly performed (i.e., the first function) and the type of function secondly performed (i.e., the second function).

SUMMARY OF THE INVENTION

However, when the type of function to be displayed is determined with out variation in accordance with the type of function firstly performed and the type of function secondly performed, the following problem may occur. Considering that a multi-function device capable of changing operation modes between a copying mode and a facsimile mode by using a mode key, a user may use the multi-function device as a copying machine specialized for the copying function when the user selects the copying mode using the mode key.

Therefore, if information displayed on the display panel is changed to the information regarding the facsimile function at a time of receiving facsimile data while the user uses the multi-function device as the copying machine, the user is forced to stop the copying operation.

If the multi-function device is provided with two display panels to respectively display two types of information regarding the two types of functions, the above mentioned problem may not occur. However, such a configuration increases the cost of the multi-function device.

If the multi-function device is configured to display the two types of information regarding the two types of functions on a single display panel by dividing a displaying area of the display panel into two areas having the same size so that the two types of information can be displayed on the two areas, respectively, the above mentioned problem may not occur. However, in this case, the viewability of the display panel is deteriorated and therefore the usability is deteriorated.

The present invention is advantageous in that it provides a multi-function device which is capable of changing ordering of priority used to determine which type of function of a plurality of types of functions should be displayed.

According to an aspect of the invention, there is provided a multi-function device capable of performing a plurality of types of functions collaterally. The multi-function device is provided with a display unit on which information regarding at least one of the plurality of typed of functions is displayed, and a display controller that controls the display unit to display the information regarding the at least one of the plurality of types of functions on the display unit. The display controller changes ordering of priority used to determine which type of information of a plurality of types of information respectively related to the plurality of types of functions should be displayed on the display unit in accordance with user operation.

With this configuration, since the ordering of priority used to determine which type of information of the plurality of types of information respectively related to the plurality of types of functions is changed in accordance with the user operation, the usability of the multi-function device is enhanced considerably.

In a particular case, the display unit may be used to display only one of the plurality of types of information respectively related to the plurality of types of functions.

Optionally, the multi-function device may include an operation unit used by a user. In this case, the display controller changes the ordering of priority in response to user operation made through the operation unit.

Still optionally, the operation unit may be used to designate one of the plurality of types of functions to be preferentially displayed on the display unit.

Still optionally, the multi-function device may include an indicator that is used to indicate the one of the plurality of types of functions designated by using the operation unit.

Still optionally, the multi-function device may include a key used to input instructions with regard to each of the plurality of types of functions. In this case, a role of the key changes in accordance with which type of function of the plurality of types of functions is designated through the operation unit.

In a particular case, the display controller may operate such that when a function of which information is preferentially displayed on the display unit is finished, information regarding a function previously preferentially displayed is preferentially displayed on the display unit.

Optionally, the display controller may have a plurality of types of tables respectively provided for the plurality of types of functions, and each of the plurality of types of tables may define the ordering of priority with regard to corresponding one of the plurality of types of functions. In this case, the display controller changes the ordering of priority by selectively using one of the plurality of types of tables.

Still optionally, the plurality of types of functions may include at least a copying function and a facsimile function.

Still optionally, when the facsimile function is interrupted by the copying function or the copying function is interrupted by the facsimile function, the display controller may display information regarding the copying function preferentially if the copying function is designated in the multi-function device and displays information regarding the facsimile function preferentially if the facsimile function is designated in the multi-function device.

According to another aspect of the invention, there is provided a multi-function device capable of performing a plurality of types of functions collaterally. The multi-function device is provided with a display unit on which information regarding at least one of the plurality of typed of functions is displayed, and a display controller that controls the display unit to display the information regarding the at least one of the plurality of types of functions on the display unit. The display controller changes ordering of priority used to determine which type of information of a plurality of types of information respectively related to the plurality of types of functions should be displayed on the display unit when the plurality of types of function are performed collaterally.

With this configuration, since the ordering of priority used to determine which type of information of the plurality of types of information respectively related to the plurality of types of functions is changed when the plurality of types of functions are performed collaterally, the usability of the multi-function device is enhanced considerably.

According to another aspect of the invention, there is provided a multi-function device capable of performing a plurality of types of functions collaterally. The multi-function device is provided with a display unit on which information regarding at least one of the plurality of typed of functions is displayed, and a display controller that controls the display unit to display the information regarding the at least one of the plurality of types of functions on the display unit. The display controller changes ordering of priority used to determine which type of information of a plurality of types of information respectively related to the plurality of types of functions should be displayed on the display unit in accordance with time information.

With this configuration, since the ordering of priority used to determine which type of information of the plurality of types of information respectively related to the plurality of types of functions is changed in accordance with time information, the usability of the multi-function device is enhanced considerably.

According to another aspect of the invention, there is provided a computer program product for use on a multi-function device capable of performing a plurality of types of functions collaterally. The computer program product includes a computer program executed to achieve a method of displaying one of a plurality of types of information respectively related to the plurality of types of functions. The method includes determining whether a first function of the plurality of types of functions is designated or not; when the first function is designated, displaying first information regarding the first function if a request for displaying the first information regarding the first function exists; and when the first function is designated, displaying second information regarding a second function of the plurality of types of functions if the request for displaying the first information regarding the first function does not exist and if a request for displaying the second information regarding the second function exists.

Further, the method includes when the first function is not designated, determining whether the second function of the plurality of types of function is designated or not; when the second function is designated, displaying the second information regarding the second function if the request for displaying the second information regarding the second function exists; and when the second function is designated, displaying the first information regarding the first function if the request for displaying the second information regarding the second function does not exist and if the request for displaying the first information regarding the first function exists.

With this configuration, since the ordering of priority used to determine which type of information of the plurality of types of information respectively related to the plurality of types of functions is changed according to which type of information is designated, the usability of the multi-function device is enhanced considerably.

DETAILED DESCRIPTION OF THE EMBODIMENTS

Hereafter, an embodiment according to the invention will be described with reference to the accompanying drawings.

Figure 1:
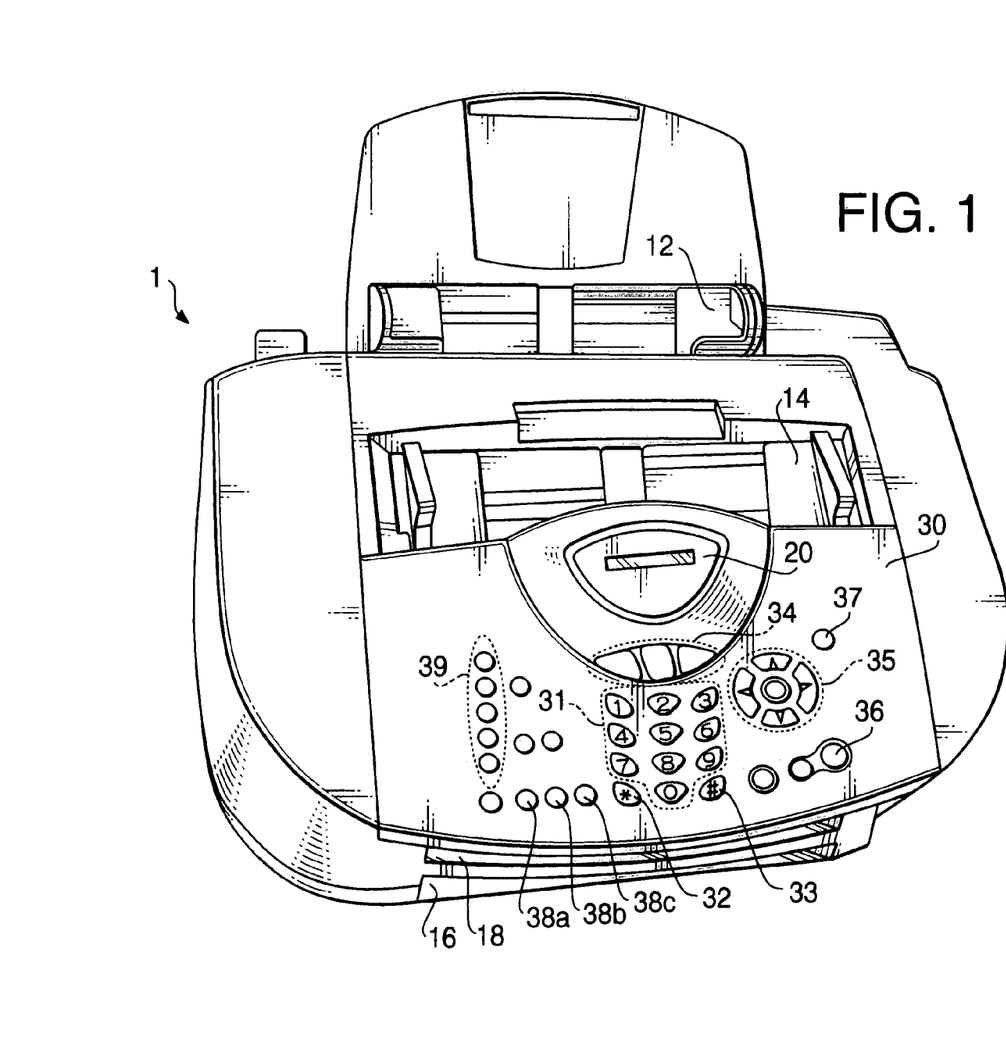
FIG. 1 shows an outside appearance of a multi-function device according to an embodiment of the invention.

FIG. 1 shows an outside appearance of a multi-function device 1 according to an embodiment of the invention. The multi-function device 1 has a plurality of functions as a printer, a copying machine, a scanner and a facsimile device. That is, the multi-function device 1 has a printing function, a copying function, a scanner function and a facsimile function.

As shown in FIG. 1, the multi-function device 1 includes a sheet supplying section 12 located on a rear side of a casing body of the multi-function device 1, an original supplying section 14 located on an upper rear side of the casing body, a sheet ejecting section 16 located on a front side of the casing body, and an original ejecting section 18 located on the front side of the casing body.

The multi-function device 1 further includes a display panel 20 located on a center portion of an upper side of the casing body, and an operation panel 30 located on a front portion of the upper side of the casing body. The operation panel 30 has numeral keys 31 of 0 through 9, an asterisk ("*") key 32, a "#" key, a function key 34, a setting key 35, a start key 36, a power key 37, a scale change key 38a, a density change key 38b, a image quality change key 38c, and one-touch dial keys 39. The function key 34 is used to change the functions of the multi-function device 1.

The setting key 35 is used to make settings for each of the functions of the multi-function device 1. The scale change key 38a is used to make settings with regard to the copying function of the multi-function device 1. The one-touch dial keys 39 are used to simplify dial inputting operation when the facsimile function is designated.

Figure 2:
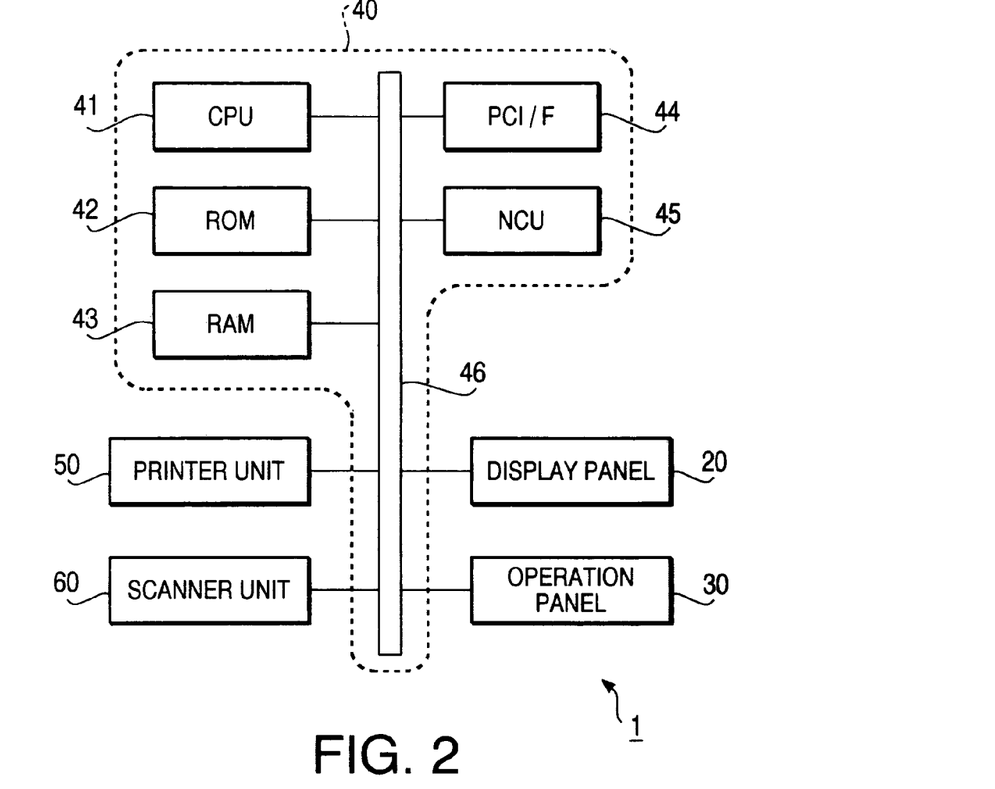
FIG. 2 shows a functional block diagram of the multi-function device shown in FIG. 1.

FIG. 2 shows a functional block diagram of the multi-function device 1 according to the embodiment. As shown in FIG. 2, the multi-function device 1 includes a control unit 40, a printer unit 50, a scanner unit 60, the display panel 20 and the operation panel 30. All of the functions of the multi-function device 1 are performed under control of the control unit 40. The control unit 40 includes a CPU (central processing unit) 41, a ROM (read only memory) 42, a RAM (random access memory) 43, a PC I/F (interface) 44, an NCU (network control unit) 45. These components shown in FIG. 2 are connected to each other via a bus 46.

The CPU 41 executes various programs stored in the ROM 42. The RAM 43 is used, for example, as a work memory for the CPU 41. The PC I/F 44 is used to connect the multi-function device 1 to an external personal computer via a communication cable. The NCU 45 is used to connect the multi-function device 1 to phone lines.

The printer unit 50 operates to carry a sheet placed on the sheet supplying section 12 toward the sheet ejecting section 16 and to form an image on the sheet. The printer unit 50 may perform printing operation by one of an inkjet printing scheme, a laser printing scheme and a thermal-transfer printing scheme.

Figure 3:
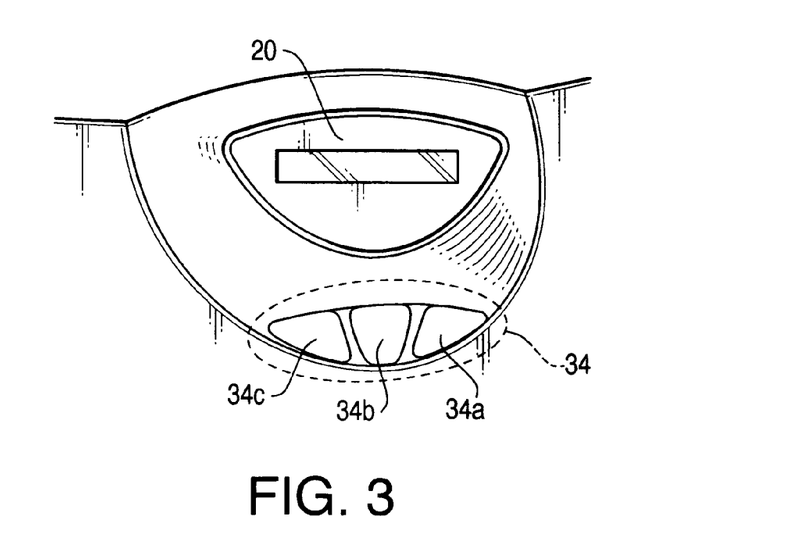
FIG. 3 is an enlarged view of the outside appearance of the multi-function device illustrating in detail a display panel and a function key.

The scanner unit 60 operates to carry an original placed on the original supplying section 14 toward the original ejecting section 18 and to read an image formed on the original. FIG. 3 is an enlarged view of the outside appearance of the multi-function device 1 illustrating in detail the display panel 20 and the function key 34. As shown in FIG. 3, the function key 34 includes a fax mode key 34a, a copy mode key 34b and a scanner mode key 34c.

The fax mode key 34a, the copy mode key 34b and the scanner mode key 34c are used to select the facsimile function, the copying function, and the scanner function, respectively. That is, by pushing one of the keys (34a,34b,34c), a user can select one of the functions of the multi-function device 1. Each of the fax mode key 34a, the copy mode key 34b and the scanner mode key 34c includes a light emitting diode to indicate selection of the function assigned to each key.

The display panel 20 is used to display information of one of the functions of the multi-function device 1. The multi-function device 1 can perform a plurality of functions collaterally. When the multi-function device 1 performs one of the functions (a first process), if another function (a second process) interrupts the first process, the indication of the information on the display panel 20 is controlled as follows.

Figure 4A:
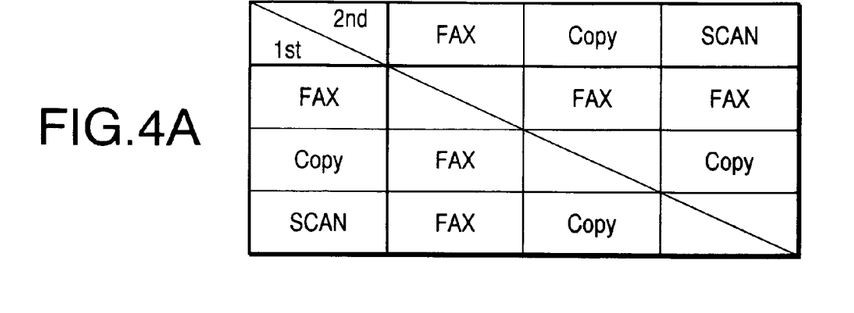
FIG. 4A shows a table defining ordering of priority with regard to a plurality of types of functions used when a facsimile function is designated.
Figure 4B:
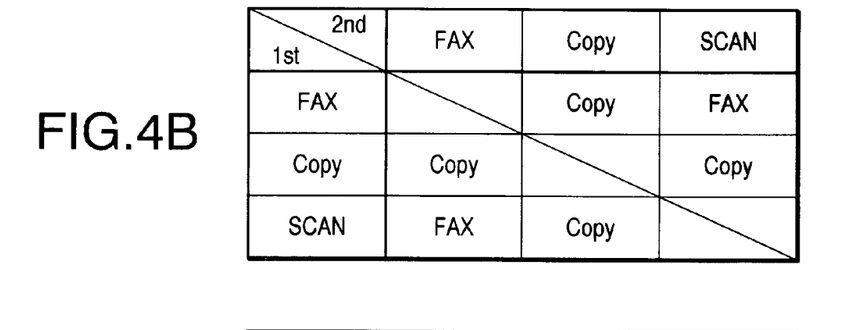
FIG. 4B shows a table defining ordering of priority with regard to the plurality of types of functions used when a copying function is designated.
Figure 4C:
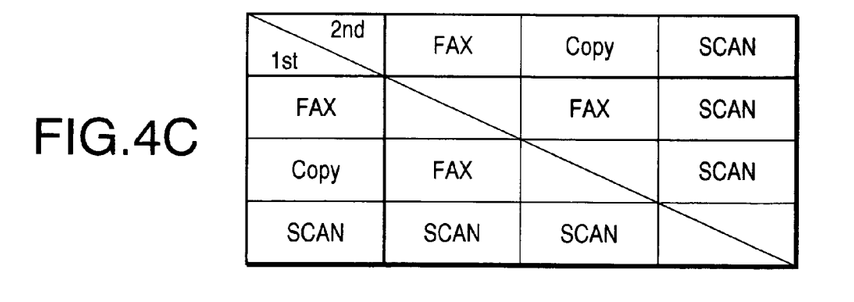
FIG. 4C shows a table defining ordering of priority with regard to the plurality of types of functions used when a scanner function is designated.

Each of FIGS. 4A, 4B and 4C shows a table which defines ordering of priority used to determine which type of function of the plurality of types of functions should be displayed on the display panel 20. That is, when the first process is interrupted by the second process, the function to be display on the display panel 20 is determined in accordance with one of the tables shown in FIGS. 4A, 4B and 4C. It is noted that in this embodiment three kinds of tables are prepared to change the ordering of priority of the functions to be displayed on the display panel 20 in accordance with conditions of the multi-function device 1.

The table shown in FIG. 4A is used when the facsimile function is selected by pushing the fax mode key 34a. As shown in FIG. 4A, when one of the first process and the second process is the facsimile function, information regarding the facsimile function is displayed on the display panel 20. When the first process is the copying function and the second process is the scanner function, or when the first process is the scanner function and the second process is the copying function, the information regarding the copying function is displayed on the display panel 20.

The table shown in FIG. 4B is used when the copying function is selected by pushing the copy mode key 3b. As shown in FIG. 4B, when one of the first process and the second process is the copying function, information regarding the copying function is displayed on the display panel 20. When the first process is the facsimile function and the second process is the scanner function, or when the first process is the scanner function and the second process is the facsimile function, the information regarding the facsimile function is displayed on the display panel 20.

The table shown in FIG. 4C is used when the scanner function is selected by pushing the scanner mode key 3c. As shown in FIG. 4C, when one of the first process and the second process is the scanner function, information regarding the scanner function is displayed on the display panel 20. When the first process is the facsimile function and the second process is the copying function, or when the first process is the copying function and the second process is the facsimile function, the information regarding the facsimile function is displayed on the display panel 20.

Figure 5:
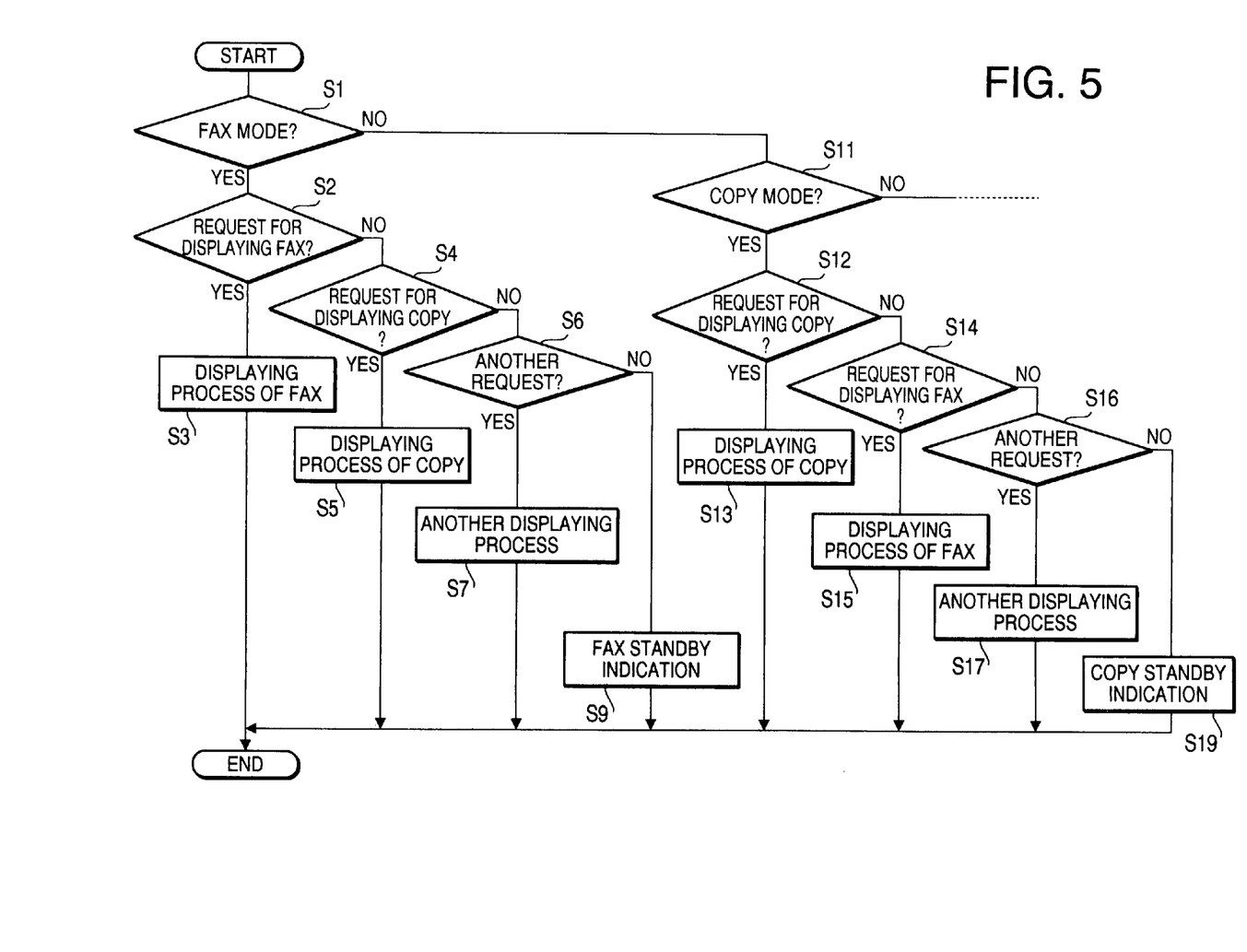
FIG. 5 is a flowchart illustrating a display control process executed by a control unit of the multi-function device.

FIG. 5 is a flowchart illustrating a display control process executed by the control unit 40. The display control process is executed repeatedly at predetermined time intervals after the power of the multi-function device 1 is turned on. The display control process shown in FIG. 5 is performed as one of various processes that the control unit 40 performs. It is noted that since the multi-function device 1 can perform the plurality of functions collaterally, when one of the functions is selected by the user using the function key 34, a request for displaying information of another function may occur in the control unit 40.

In step S1, it is determined whether the fax mode key 34a is pushed or not (i.e., whether the facsimile function is selected by the user or not). When the fax mode key 34a is pushed (S1:YES), control proceeds to step S2 to control the indication of information on the display panel 20 in accordance with the table show in FIG. 4A. When the fax mode key 34a is not pushed (S1:NO), control proceeds to step S11.

In step S2, it is determined whether a request for indicating information regarding the facsimile function exists or not. When the request for indicating information regarding the facsimile function exists (S2:YES), control proceeds to step S3. In step S3, the information regarding the facsimile function is displayed on the display panel 20. Then, the display control process terminates.

When the request for indicating information regarding the facsimile function does not exist (S2:NO), control proceeds to step S4. In step S4, it is determined whether a request for indicating information regarding the copying function exists or not. When the request for indicating information regarding the copying function exists (S4:YES), control proceeds to step S5. In step S5, the information regarding the copying function is displayed on the display panel 20. Then, the display control process terminates.

When the request for indicating information regarding the copying function does not exist (S4:NO), control proceeds to step S6. In step S6, it is determined whether a request for indicating information regarding another function (e.g., the scanner function) exists or not.

When the request for indicating information regarding another function exists (S6:YES), control proceeds to step S7. In step S7, the information regarding another function is displayed on the display panel 20. Then, the display control process terminates. When the request for indicating information regarding another function does not exist (S6:NO), control proceeds to step S9. In step S9, information indicating standby of the facsimile function is displayed on the display panel 20. Then, the display control process terminates. It is under stood that by repeating the process including step S2 through step S9, the displaying control in accordance with the table shown in FIG. 4A is accomplished.

In step S11, it is determined whether the copy mode key 34*b* is pushed or not (i.e., whether the copying function is selected by the used or not). When the copy mode key 34*b* is pushed (S11:YES), control proceeds to step S12 to control the indication of information on the display panel 20 in accordance with the table show in FIG. 4B.

In step S12, it is determined whether a request for indicating information regarding the copying function exists or not. When the request for indicating information regarding the copying function exists (S12:YES), control proceeds to step S13. In step S13, the information regarding the copying function is displayed on the display panel 20. Then, the display control process terminates.

When the request for indicating information regarding the copying function does not exist (S12:NO), control proceeds to step S14. In step S14, it is determined whether a request for indicating information regarding the facsimile function exists or not. When the request for indicating information regarding the facsimile function exists (S14:YES), control proceeds to step S15. In step S15, the information regarding the facsimile function is displayed on the display panel 20. Then, the display control process terminates.

When the request for indicating information regarding the facsimile function does not exist (S14:NO), control proceeds to step S16. In step S16, it is determined whether a request for indicating information regarding another function (e.g., the scanner function) exists or not.

When the request for indicating information regarding another function exists (S16:YES), control proceeds to step S17. In step S15, the information regarding another function is displayed on the display panel 20. Then, the display control process terminates.

When the request for indicating information regarding another function does not exist (S16:NO), control proceeds to step S19. In step S19, information indicating standby of the copying function is displayed on the display panel 20. Then, the display control process terminates. It is under stood that by repeating the process including step S12 through step S19, the displaying control in accordance with the table shown in FIG. 4B is accomplished.

When it is determined in step S11 that the copy mode key 34*b* is not pushed (S11:NO) and it is determined that the scanner mode key 34*c* is pushed, the process including steps similar to steps from S2 through S9 or similar to steps from S12 through S19 may be performed to accomplish the displaying control in accordance with the table shown in FIG. 4C.

As described above, according to the embodiment, the information regarding the function designated through the function key 34 is preferentially displayed on the display panel 20 (i.e., the function designated through the function key 34 is given the highest priority). Therefore, the usability of the multi-function device 1 is enhanced.

Figure 6:
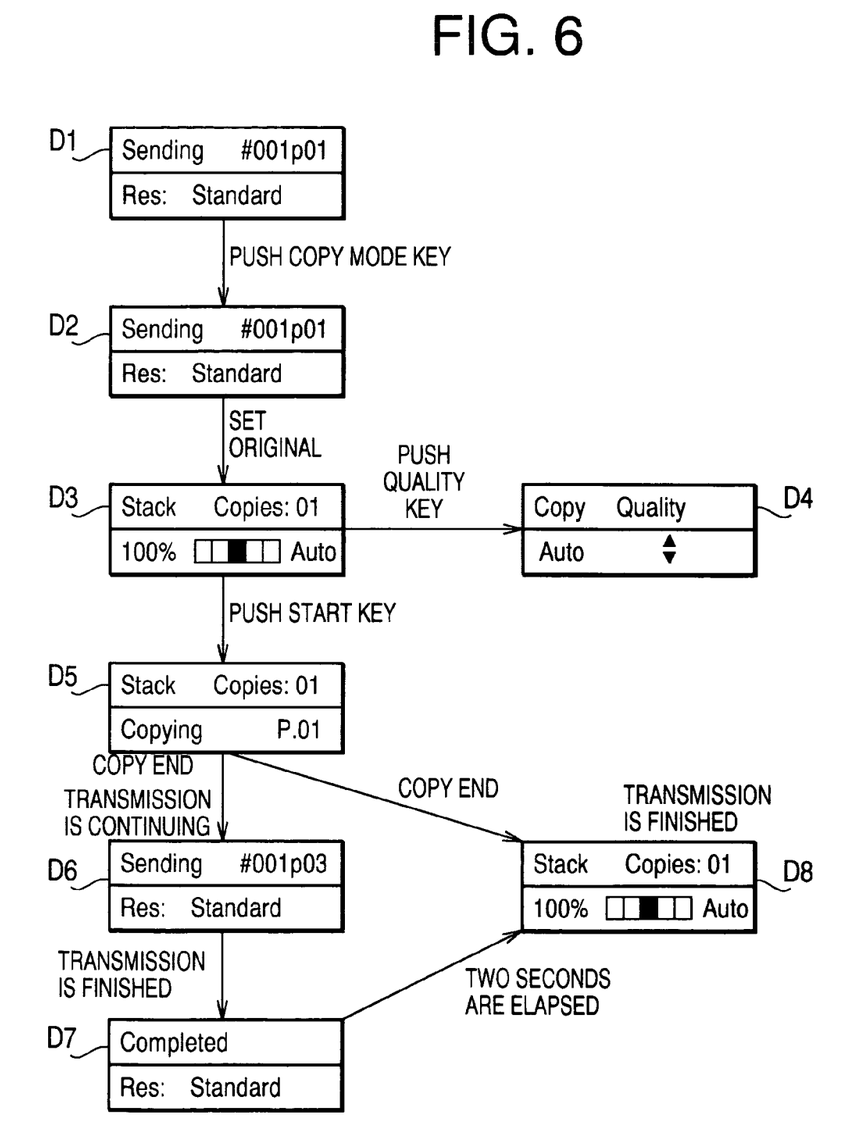
FIG. 6 shows an example of transition of information displayed on the display panel accomplished by the display control process.

FIG. 6 shows an example of the transition of the information displayed on the display panel 20 accomplished by the display control process according to the embodiment. FIG. 6 shows a case where the user pushes the copy mode key 34*b* during the facsimile transmission to make copies of documents. Before the copy mode key 34*b* is pushed (stage D1), the information indicating, for example, transmission of a first sheet of a first job ("Sending #001P01") is displayed on first sheet of the display panel 20. On the lower side of the display panel 20, information indicating that a transmission resolution of facsimile data is standard.

When the copy mode key 34*b* is pushed, and an original is set on the original supplying section 14, indication on the display panel 20 is changed to information regarding the copying function. At a stage D2 where only the copy mode key 34*b* is pushed, the indication is not changed.

At a stage D3 where the original is set on the original supplying section 14, the information indicating the number of copies ("Stack copies: 01") is displayed on the upper side of the display panel 20. Further, the information including a scaling factor ("100%"), a bar indicative of the density, and letters "Auto" indicative of an image quality is played on the lower side of the display panel 20.

In this stage, the scaling factor, the density and the image quality can be adjusted by operating the scale change key 38*a*, the density change key 38*b* and the image quality change key 38*c*, respectively. For example, when the image quality change key 38*c* is pushed, the letters "Copy Quality" is displayed on the upper side of the display panel 20, and the letters "Auto" and up and down arrows are indicated on the lower side of the display panel 20 (a stage D4). In this stage D4, the image quality can be adjusted by operating the setting key 35, and the number of copies can be adjusted by using the numeral keys 31.

When the start key 36 is pushed after the setting operation is finished, the copying operation is performed by using the printer unit 50 and the scanner unit 60 (a stage D5). In this stage D5, letters "Copying" indicating that the copying operation is performed and the page number are displayed on the lower side of the display panel 20. If the number of copies more than two is designated, the number of the copy being processed is displayed on the upper side of the display panel 20.

When the copying operation is finished, if the facsimile transmission is not finished, the information on the display panel 20 is changed to the information regarding the facsimile function started at the stage D1 (see a stage D6). This transition from the stage D5 to the stage D6 corresponds to a case where it is determined in step S12 that the request for indicating information regarding the copying function does not exists (S12:NO) and that it is determined in step S14 that the request for indicating information regarding the facsimile function exists (S14:YES).

In the stage D6, since two pages have been finished in the copying operation, letters "Sending #001p03" indicating that the third page of the first job is processed are indicated on the upper side of the display panel 20. Further, similarly to the stage D1 the letters "Res:Standard" are displayed on the lower side of the display panel 20.

When the copying operation is finished, if the facsimile transmission is finished, the same information as that of the stage D3 is displayed (a stage D8). This transition from the stage D5 to the stage D8 corresponds to a case where information indicating standby of the copying function is displayed in step S19.

When the facsimile transmission is finished, information indicative of the completion of the facsimile transmission is displayed on the display panel 20 (a stage D7). After two seconds are elapsed from the completion of the facsimile transmission, the indication is changed to the indication on the stage D8 (i.e., the standby of the copying function).

Figure 7:
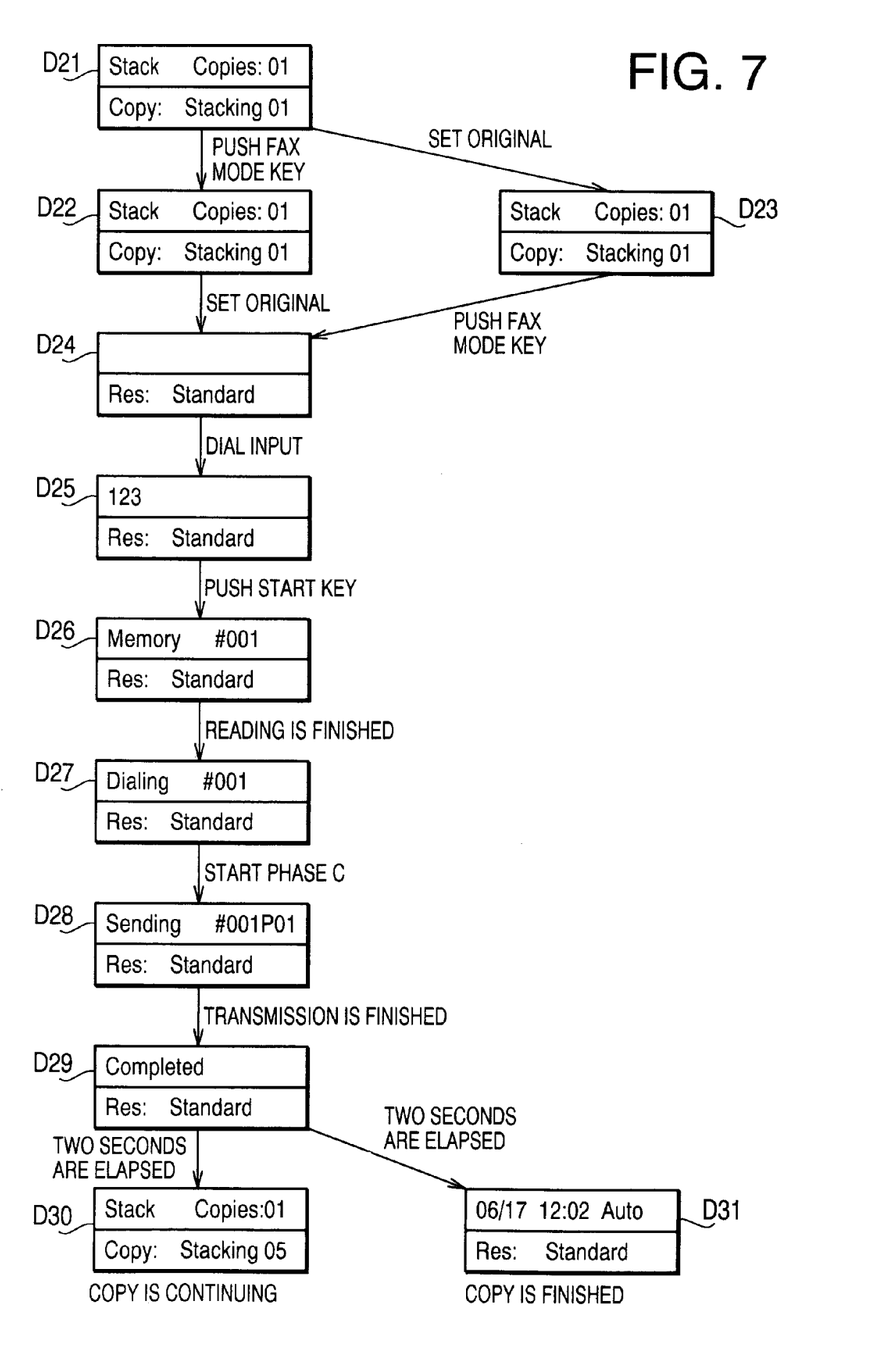
FIG. 7 shows another example of transition of information displayed on the display panel accomplished by the display control process.

FIG. 7 shows another example of the transition of the information displayed on the display panel 20 accomplished by the display control process according to the embodiment. FIG. 7 shows a case where the user pushes the fax mode key 34a during the copying process for making more than two copies. Before the fax mode key 34a is pushed or before an original is set in the original supplying section 14 (stage D21), the information regarding the copying function is displayed on the display panel 20.

When the fax mode key 34a is firstly pushed (at a stage D22) and an original is set on the original supplying section 14 secondly, the indication is changed (at a stage D24). Alternatively, when the original is set in the original supplying section 14 firstly (at a stage D23) and the fax mode key 34a is pushed secondly, the indication is changed (at the stage D24).

In the stage D24, the letters "Res:Standard" is displayed on the lower side of the display panel 20. At this stage D24, no indication is made on the upper side of the display panel 20.

When the dial number is inputted using the numeral keys 31, inputted numbers are displayed on the upper side of the display panel 20 (a stage D25). When the start key 36 is pushed after the dial number is inputted, the scanner unit 60 starts to read the original. During the reading process of the original, a job number "Memory #001" is displayed on the upper side of the display panel 20 (a stage D26).

When the reading process is finished, a dialing process is initiated (a stage D27). Then, the data transmission (a phase C) is started (a stage D28). When the data transmission is completed, letters "Completed" are displayed on the upper side of the display panel 20 (a stage D29).

After two seconds are elapsed from the completion of the data transmission, if the copying process is not finished, the information regarding the copying function is displayed on the display panel (a stage D30). The transition form the stage D29 to the stage D30 corresponds to a case where it is determined in step S2 that the request for indicating information regarding the facsimile function does exist (S2:NO) and it is determined in step S4 that the request for indicating information regarding the copying function exists (S4:YES).

As shown in the indication of the stage D30, if the number of copies completed during the data transmission process is increased, the increased number is indicated after the letters "Copy:Stacking" on the lower side of the display panel 20.

After two seconds are elapsed from the completion of the data transmission, if the copying process is finished, the information indicating the standby of the facsimile function is displayed on the display panel (a stage D31). For example, the information indicating the standby of the facsimile function includes a date, time and letters "Auto" indicative of an automatic receiving. The indication in the stage D31 corresponds to step S9 of the display control process in FIG. 5.

Figure 8A:
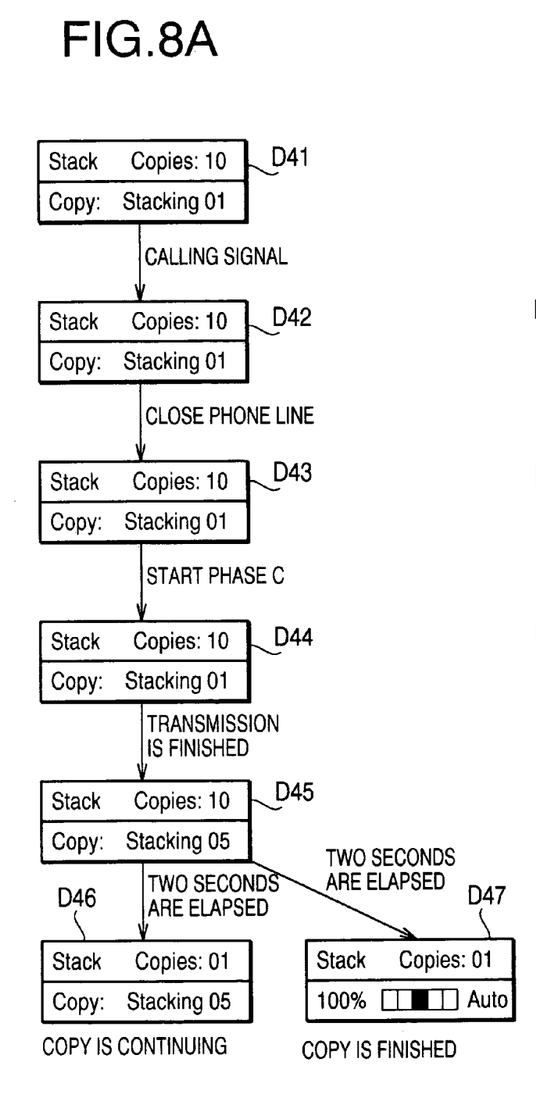
FIG. 8A shows another example of transition of information displayed on the display panel illustrating a case where facsimile data is received while the copying function is selected.

FIG. 8A shows another example of the transition of the information displayed on the display panel 20 accomplished by the display control process according to the embodiment. FIG. 8A shows a case where facsimile data is received while the copying function is selected (i.e., facsimile data is received while the copy mode key 34b is pushed and lighted).

Since the request for indicating information regarding the copying function constantly occurs during the copying operation, the information regarding the copying function is displayed on the display panel 20 regardless of the process of the facsimile receiving.

At a stage D41, the copying operation is performed and the facsimile receiving is not started. In this stage D41, the information regarding the copying function is indicated. When a calling signal from the phone line is received, a stage D42 is reached. In this stage D42, the information regarding the copying function is also indicated.

When the phone line is closed, a stage D43 is reached. In this stage D43, the information regarding the copying function is also indicated. When the data transmission (the phase C) is started, a stage D44 is reached. In this stage D44, the information regarding the copying function is also indicated.

When the data transmission is finished, a stage D45 is reached. In this stage D45, the information regarding the copying function is also indicated. After two seconds are elapsed from the completion of the data transmission, if the copying operation is not finished, the information regarding the copying function is displayed (in a stage D46). After two seconds are elapsed from the completion of the data transmission, if the copying operation is finished, the information indicating standby of the copying function is displayed (in a stage D47).

The example shown in FIG. 8A is explained as follows using the display control process shown in FIG. 5. During the copying operation, the request for indicating information regarding the copying function constantly occurs, and therefore in step S12 it is determined that the request exists (S12:YES) and the information regarding the copying function is constantly displayed (S13). When the copying operation is finished, the information indicating standby of the copying function is displayed (in a stage D47).

Figure 8B:
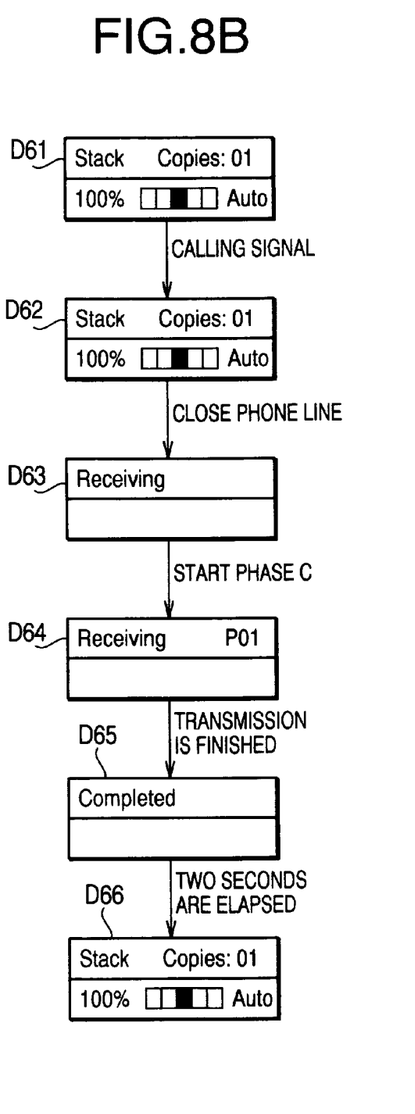
FIG. 8B shows another example of transition of information displayed on the display panel illustrating a case where facsimile data is received during standby of the copying function.

FIG. 8B shows another example of the transition of the information displayed on the display panel 20 accomplished by the display control process according to the embodiment. FIG. 8B shows a case where facsimile data is received during the standby of the copying function.

At a stage D61, the multi-function device 1 is in a condition of standby of the copying function. In this stage D61, the information regarding the standby of the copying function is indicated. When a calling signal from the phone line is received, a stage D62 is reached. In this stage D62, the information regarding the standby of the copying function is also indicated.

When the phone line is closed, a stage D63 is reached. In this stage D63, letters "Receiving" indicating that the facsimile data is received is displayed on the upper side of the display panel 20. When the data transmission (the phase C) is started, a stage D64 is reached. In this stage D64, the page number "P01" is indicated after the letters "Receiving".

When the data transmission is finished, a stage D65 is reached. In this stage D65, letters "Completed" indicative of the completion of the facsimile data receiving are displayed on the upper side of the display panel 20. After two seconds are elapsed from the completion of the data transmission, the information regarding the standby of the copying function is indicated again.

The example shown in FIG. 8B is explained as follows using the display control process shown in FIG. 5. When the facsimile data is received during the standby of the copying function, since the request for indicating the information of the copying function does not exist (S12:NO), the information regarding the facsimile function (e.g., "Receiving") is indicated (S14:YES and S15). After the completion of the facsimile data receiving, the information of the standby of the copying function is displayed again in step S19.

It is noted that if the fax mode key 34a is pushed during the process shown in FIG. 8A, the information regarding the facsimile function (e.g., "Receiving") can be displayed.

As described above, according to the embodiment, the ordering of priority used to determine which type of information of the plurality of types of information respectively related to the plurality of types of functions should be displayed on the display panel is changed by designating one of the functions using the function key 34. Therefore, the usability of the multi-function device 1 is enhanced considerably.

For example, the user can use the multi-function device as a copying machine specialized for the copying function when the copy mode key 34b is pushed and the copying operation is performed regardless of whether facsimile data is received or not. Further, since in this case the selected copy mode key 34b is lighted (i.e., the designated function is indicated), the user can securely recognize that the copying function is designated.

As shown in FIG. 8B, when the facsimile function is finished (which interrupted the copying function), the information regarding the previously performed copying function is displayed again. Therefore, the usability is enhanced.

Although the present invention has been described in considerable detail with reference to certain preferred embodiments thereof, other embodiments are possible.

For example, although in the above mentioned embodiment the display panel 20 displays different items on the upper side and the lower side thereof, respectively, the display panel 20 may be configured to display only one item on a single row.

The display panel 20 may have larger size sufficiently for displaying two or more types of information related to the two or more types of functions simultaneously.

On the display panel 20, the plurality of types of information related to the plurality of types of functions may be alternately displayed. In this case, the information of the function given the high priority may be displayed for a time longer than that of another function.

In the above mentioned embodiment, the ordering of priority used to determine which type of information of the plurality of types of information respectively related to the plurality of types of functions should be displayed on the display panel is changed in accordance with the operation through the function key 34. However, the ordering of priority may be changed in accordance with time information. For example, the ordering of priority may be switched between the daytime and the nighttime.

In the above mentioned embodiment, the numeral keys 31 are used to input the number of copies while the copying function is selected and are used to input the dial number while the facsimile function is selected. That is, the plurality of roles are assigned to the numeral keys 31 to reduce the cost of the multi-function device 1. However, a plurality of types of input keys for inputting instructions may be provided respectively for the plurality of types of functions.

The present disclosure relates to the subject matter contained in Japanese Patent Application No. 2003-313022, filed on Sep. 4, 2003, which is expressly incorporated herein by reference in its entirety.

What is claimed is:

1. A multi-function device for performing a plurality of types of functions collaterally, comprising:
    a display unit on which information regarding at least one of the plurality of types of functions is displayed; and
    a display controller that controls the display unit to display the information regarding at least one of the plurality of types of functions on the display unit, the display controller determining an order of priority repeatedly and at predetermined time intervals, and changing the order of priority used to determine which type of information of a plurality of types of information respectively related to the plurality of types of functions is displayed on the display unit in accordance with user operation, if the determined priority is different from the determined priority of a previous interval of the predetermined intervals,
    wherein the display controller has a plurality of tables of priority data respectively provided for the plurality of types of functions, each of the plurality of tables of priority data defining the order of priority with regard to corresponding one of the plurality of types of functions,
    wherein the display controller changes the order of priority with regard to the same plurality of types of functions by selectively using one of the plurality of tables of priority data.

2. The multi-function device according to claim 1, wherein the display unit is used to display only one of the plurality of types of information respectively related to the plurality of types of functions.

3. The multi-function device according to claim 1, further comprising an operation unit used by a user,
    wherein the display controller changes the order of priority in response to the user operation made through the operation unit.

4. The multi-function device according to claim 3, wherein the operation unit is used to designate one of the plurality of types of functions to be preferentially displayed on the display unit.

5. The multi-function device according to claim 4, further comprising an indicator that is used to indicate the one of the plurality of types of functions designated by using the operation unit.

6. The multi-function device according to claim 4, further comprising a key used to input instructions with regard to each of the plurality of types of functions,
    wherein a role of the key changes in accordance with which type of function of the plurality of types of functions is designated through the operation unit.

7. The multi-function device according to claim 1, wherein the display controller operates such that when a function of which information is preferentially displayed on the display unit is finished, information regarding a function previously preferentially displayed is preferentially displayed on the display unit.

8. The multi-function device according to claim 1,
    wherein the plurality of types of tables are respectively provided for the plurality of types of functions.

9. The multi-function device according to claim 1, wherein the plurality of types of functions includes at least a copying function and a facsimile function.

10. The multi-function device according to claim 9, wherein when the facsimile function is interrupted by the copying function or the copying function is interrupted by the facsimile function, the display controller displays information regarding the copying function preferentially if the copying function is designated in the multi-function device and displays information regarding the facsimile function preferentially if the facsimile function is designated in the multi-function device.

11. A multi-function device for performing a plurality of types of functions collaterally, comprising:
    a display unit on which information regarding at least one of the plurality of typed of functions is displayed; and
    a display controller that controls the display unit to display the information regarding at least one of the plurality of types of functions on the display unit, the display controller determining an order of priority repeatedly and at predetermined time intervals, and changing the order of priority used to determine which type of information of a plurality of types of information respectively related to the plurality of types of functions is displayed on the display unit when the plurality of types of functions are performed collaterally, if the determined priority is different from the determined priority of a previous interval of the predetermined intervals, wherein the display controller has a plurality of tables of priority data respectively provided for the plurality of types of functions, each of the plurality of tables of priority data defining the order of priority with regard to corresponding one of the plurality of types of functions, wherein the display controller changes the order of priority with regard to the same plurality of types of functions by selectively using one of the plurality of tables of priority data.

12. The multi-function device according to claim 11, wherein the plurality of types of tables are respectively provided for the plurality of types of functions.

13. A multi-function device for performing a plurality of types of functions collaterally, comprising:

a display unit on which information regarding at least one of the plurality of typed of functions is displayed; and a display controller that controls the display unit to display the information regarding at least one of the plurality of types of functions on the display unit, the display controller determining an order of priority repeatedly and at predetermined time intervals, and changing the order of priority used to determine which type of information of a plurality of types of information respectively related to the plurality of types of functions is displayed on the display unit in accordance with time information, if the determined priority is different from the determined priority of a previous interval of the predetermined intervals, wherein the display controller has a plurality of tables of priority data respectively provided for the plurality of types of functions, each of the plurality of tables of priority data defining the order of priority with regard to corresponding one of the plurality of types of functions, wherein the display controller changes the order of priority with regard to the same plurality of types of functions by selectively using one of the plurality of tables of priority data.

14. The multi-function device according to claim 13, wherein the plurality of types of tables are respectively provided for the plurality of types of functions.

15. A computer-readable storage medium encoding a computer-executable program for use on a multi-function device for performing a plurality of types of function collaterally, the computer program comprising instruction for:

displaying information regarding at least one of the plurality of types of functions on a display unit; and controlling, via a display controller, the display unit to display the information regarding at least one of the plurality of types of functions on the display unit, the display controller determining an order of priority repeatedly and at predetermined time intervals, and changing the order of priority used to determine which type of information of a plurality of types of information respectively related to the plurality of types of functions is displayed on the display unit in accordance with user operation, if the determined priority is different from the determined priority of a previous interval of the predetermined intervals, wherein the display controller has a plurality of tables of priority data respectively provided for the plurality of types of functions, each of the plurality of tables of priority data defining the order of priority with regard to corresponding one of the plurality of types of functions, wherein the display controller changes the order of priority with regard to the same plurality of types of functions by selectively using one of the plurality of tables of priority data.

* * * * *